(12) United States Patent
Meng et al.

(10) Patent No.: US 11,738,724 B2
(45) Date of Patent: Aug. 29, 2023

(54) VEHICLE BRAKING AND WARNING METHOD, SYSTEM AND DEVICE BASED ON BINOCULAR STEREO CAMERA

(71) Applicant: Beijing Smarter Eye Technology Co. Ltd., Beijing (CN)

(72) Inventors: Ran Meng, Beijing (CN); Hua Chai, Beijing (CN); Yanqiu Xia, Beijing (CN); Zhe Wang, Beijing (CN); Yong Jia, Beijing (CN); Hui Cai, Beijing (CN); Chuanbin Feng, Beijing (CN)

(73) Assignee: Beijing Smarter Eye Technology Co. Ltd., Beijing (CN)

( * ) Notice: Subject to any disclaimer, the term of this patent is extended or adjusted under 35 U.S.C. 154(b) by 223 days.

(21) Appl. No.: 17/176,523

(22) Filed: Feb. 16, 2021

(65) Prior Publication Data

US 2022/0097661 A1 Mar. 31, 2022

(30) Foreign Application Priority Data

Sep. 27, 2020 (CN) .......................... 202011035172.4

(51) Int. Cl.
*B60T 7/12* (2006.01)
*G06V 20/58* (2022.01)
(Continued)

(52) U.S. Cl.
CPC ............... *B60T 7/12* (2013.01); *B60T 17/22* (2013.01); *G01S 13/867* (2013.01);
(Continued)

(58) Field of Classification Search
CPC ........ B60T 2210/32; B60T 7/12; B60T 17/22; B60T 2201/022; G06V 20/58;
(Continued)

(56) References Cited

U.S. PATENT DOCUMENTS 6,580,385 B1 * 6/2003 Winner ................. G01S 17/931
180/169
2016/0139598 A1 * 5/2016 Ichikawa ............. B60W 30/09
701/25

FOREIGN PATENT DOCUMENTS

CN 106347351 A * 1/2017
JP 2006306273 A * 11/2006

OTHER PUBLICATIONS

Machine Translation of Xiao's reference (CN-106347351-A) (Year: 2017).*
(Continued)

*Primary Examiner* — Tarek Elarabi
(74) *Attorney, Agent, or Firm* — NKL Law; Allen Xue (57) ABSTRACT

A vehicle braking and warning method includes: acquiring first target information within a detection range of the binocular stereo camera, second target information within a detection range of a millimeter-wave radar, and current vehicle driving information; acquiring sensing result data about a target obstacle in accordance with the first target information and the second target information in conjunction with a predetermined weight; and outputting a braking instruction and/or a warning instruction in accordance with the sensing result data and the current vehicle driving information so as to enable a vehicle to adjust its driving state in accordance with the instructions.

8 Claims, 4 Drawing Sheets

(51) Int. Cl.
　　　*B60T 17/22*　　　(2006.01)
　　　*G01S 13/86*　　　(2006.01)
　　　*G01S 13/931*　　(2020.01)
　　　*G08G 1/16*　　　(2006.01)
　　　*H04N 13/239*　　(2018.01)

(52) U.S. Cl.
　　　CPC ............ *G01S 13/931* (2013.01); *G06V 20/58* (2022.01); *G08G 1/165* (2013.01); *G08G 1/166* (2013.01); *B60T 2210/32* (2013.01); *G01S 2013/93185* (2020.01); *H04N 13/239* (2018.05)

(58) Field of Classification Search
　　　CPC ................ G01S 13/867; G01S 13/931; G01S 2013/93185; G08G 1/165; G08G 1/166; H04N 13/239; B60W 50/14
　　　See application file for complete search history.

(56) References Cited

OTHER PUBLICATIONS

Machine Translation of Keigo's reference (JP-2006306273-A) (Year: 2006).*

* cited by examiner

VEHICLE BRAKING AND WARNING METHOD, SYSTEM AND DEVICE BASED ON BINOCULAR STEREO CAMERA

CROSS-REFERENCES TO RELATED APPLICATIONS

This application claims priority to and the benefit of Chinese Patent Application No. 202011035172.4, filed on Sep. 27, 2020, the disclosure of which is incorporated herein by reference in its entirety.

TECHNICAL FIELD

The present disclosure relates to the field of autonomous driving technology, in particular to vehicle braking and warning method, system and device based on a binocular stereo camera.

BACKGROUND

Recently, along with the rapid development of the Artificial Intelligence (AI) technology and the concern to traffic security, the Ministry of Communications has proposed relevant standards about an Autonomous Emergency Braking System (AEBS) involving active safety. In the related art, usually a sensing module of the AEBS includes a monocular camera, a millimeter-wave radar, a single-line laser, a laser radar or an ultrasonic radar, or a combination thereof.

However, these sensors have obviously drawbacks. The monocular camera is merely capable of performing identification and distance measurement on vehicles and pedestrians, and it is incapable of detecting any other type of obstacles on a road. The millimeter-wave radar has a long measurement distance and a strong penetration capability, but it is incompetent to detect the pedestrians and easily susceptible to an interference from a metal object. The single-line laser has a small coverage range, and it is impossible to detect an entire running trajectory and it is incompetent to detect a black object. The laser radar has an insufficient penetration capability and high manufacture cost, and it is incompetent to detect a black object. The ultrasonic radar has a short detection distance, and it is merely capable of detecting a neighboring obstacle when a vehicle is reversed.

SUMMARY

An object of the present disclosure is to provide vehicle braking and warning method, system and device based on a binocular stereo camera, so as to at least partially solve the problems in the related art where the types of the to-be-detected obstacles are limited, and braking and warning strategies are imperfect.

In one aspect, the present disclosure provides in some embodiments a vehicle braking and warning method based on a binocular stereo camera, including: acquiring first target information within a detection range of the binocular stereo camera, second target information within a detection range of a millimeter-wave radar, and current vehicle driving information; acquiring sensing result data about a target obstacle in accordance with the first target information and the second target information in conjunction with a predetermined weight; and outputting a braking instruction and/or a warning instruction in accordance with the sensing result data and the current vehicle driving information so as to enable a vehicle to adjust its driving state in accordance with the instructions.

In a possible embodiment of the present disclosure, the acquiring the sensing result data about the target obstacle in accordance with the first target information and the second target information in conjunction with the predetermined weight includes: acquiring a distance between the target obstacle and the vehicle; when the distance is greater than a maximum distance threshold or smaller than a minimum distance threshold, taking the second target information acquired by the millimeter-wave radar as the sensing result data; and when the distance is greater than or equal to the minimum distance threshold or smaller than or equal to the maximum distance threshold, taking the first target information acquired by the binocular stereo camera as the sensing result data.

In a possible embodiment of the present disclosure, the outputting the braking instruction and/or the warning instruction in accordance with the sensing result data and the current vehicle driving information so as to enable the vehicle to adjust its driving state in accordance with the instructions includes: calculating a first collision time $T_{mov}$ of the vehicle with a moving obstacle using a formula $T_{mov}=S/\Delta V$, where S represents a distance between the obstacle and the vehicle, and $\Delta V$ represents a difference between a speed of the obstacle and a speed of the vehicle in a movement direction of the vehicle; calculating a second collision time $T_{static}$ of the vehicle with a static obstacle using a formula $T_{static}=S/V$, where S represents a distance between the obstacle and the vehicle, and V represents the speed of the vehicle; when the first collision time $T_{mov}$ is smaller than a moving obstacle braking threshold or the second collision time $T_{static}$ is smaller than a static obstacle braking threshold, outputting the braking instruction; and when the first collision time $T_{mov}$ is smaller than a moving obstacle warning threshold or the second collision time $T_{static}$ is smaller than a static obstacle warning threshold, outputting the warning instruction.

In a possible embodiment of the present disclosure, the target obstacle is an obstacle closest to the vehicle in all obstacles within the range of a vehicle movement trajectory when any sensing data and vehicle information have been received.

In a possible embodiment of the present disclosure, the vehicle braking and warning method further includes: acquiring a braking emergency level, the braking instruction including braking at a low frequency, braking at a middle frequency, braking at a high frequency, braking at a small force, braking at a middle force, and braking at a large force depending on the braking emergency level; and/or acquiring a warning emergency level, the warning instruction including warning at a low frequency and emergency warning depending on the warning emergency level.

In a possible embodiment of the present disclosure, prior to outputting the braking instruction and/or the warning instruction, the vehicle braking and warning method further includes: acquiring a braking state and a gear position state of the vehicle; and when the vehicle is in the braking state or a gear position of the vehicle is non-drive, cancelling the output of the braking instruction and the warning instruction.

In another aspect, the present disclosure provides in some embodiments a vehicle braking and warning system based on a binocular stereo camera for implementing the above-mentioned method, including: a target information acquisition unit configured to acquire first target information within a detection range of the binocular stereo camera, second target information within a detection range of a millimeter-wave radar, and current vehicle driving information; a sensing data acquisition unit configured to acquire sensing result data about a target obstacle in accordance with the first target information and the second target information in conjunction with a predetermined weight; and an instruction output unit configured to output a braking instruction and/or a warning instruction in accordance with the sensing result data and the current vehicle driving information so as to enable a vehicle to adjust its driving state in accordance with the instructions.

In a possible embodiment of the present disclosure, the instruction output unit is further configured to: calculate a first collision time $T_{mov}$ of the vehicle with a moving obstacle using a formula $T_{mov}=S/\Delta V$, where S represents a distance between the obstacle and the vehicle, and $\Delta V$ represents a difference between a speed of the obstacle and a speed of the vehicle in a movement direction of the vehicle; calculate a second collision time $T_{static}$ of the vehicle with a static obstacle using a formula $T_{static}=S/V$, where S represents a distance between the obstacle and the vehicle, and V represents the speed of the vehicle; when the first collision time $T_{mov}$ is smaller than a moving obstacle braking threshold or the second collision time $T_{static}$ is smaller than a static obstacle braking threshold, output the braking instruction; and when the first collision time $T_{mov}$ is smaller than a moving obstacle warning threshold or the second collision time $T_{static}$ is smaller than a static obstacle warning threshold, output the warning instruction.

In yet another aspect, the present disclosure provides in some embodiments a vehicle braking and warning device based on a binocular stereo camera, including a data collection unit configured to collect data, a memory configured to store therein one or more program instructions, and a processor configured to execute the one or more program instruction so as to implement the above-mentioned method.

In still yet another aspect, the present disclosure provides in some embodiments a computer-readable storage medium storing therein one or more program instructions for implementing the above-mentioned method.

According to the vehicle braking and warning method, system and device based on the binocular stereo camera in the embodiments of the present disclosure, the first target information within the detection range of the binocular stereo camera, the second target information within the detection range of the millimeter-wave radar, and the current vehicle driving information may be acquired. Next, the sensing result data about the target obstacle may be acquired in accordance with the first target information and the second target information in conjunction with the predetermined weight. Then, the braking instruction and/or the warning instruction may be outputted in accordance with the sensing result data and the current vehicle driving information so as to enable the vehicle to adjust its driving state in accordance with the instructions. Through combining the data acquired by the binocular stereo camera and the millimeter-wave radar, it is able to detect, in real time, any obstacle within the range of the driving trajectory of the vehicle, thereby to prevent the occurrence of a collision in front of the vehicle or reduce a severity level of the collision. When any obstacle occurs within the range of the driving trajectory of the vehicle, the system may automatically give a prompt or brake the vehicle, so as to prevent, or reduce to some extent, the occurrence of the collision caused when a driver is driving in fatigue, dozing, distracted or chatting, thereby to solve the problems in the related art where the types of the to-be-detected obstacles are limited, and braking and warning strategies are imperfect.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

The structure, scale and size shown in the drawings are merely provided to facilitate the understanding of the contents disclosed in the description but shall not be construed as limiting the scope of the present disclosure, so they has not substantial meanings technically. Any modification on the structure, any change to the scale or any adjustment on the size shall also fall within the scope of the present disclosure in the case of not influencing the effects and the purposes of the present disclosure.

DETAILED DESCRIPTION

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

An object of the present disclosure is to provide vehicle braking and warning method, system and device based on a binocular stereo camera, so as to combine data acquired by the binocular stereo camera and a millimeter-wave radar using a binocular stereo camera-based AEBS, and detect, in real time, any obstacle within a range of a driving trajectory of a vehicle, thereby to prevent the occurrence of a collision in front of the vehicle or reduce a severity level of the collision.

Figure 1:
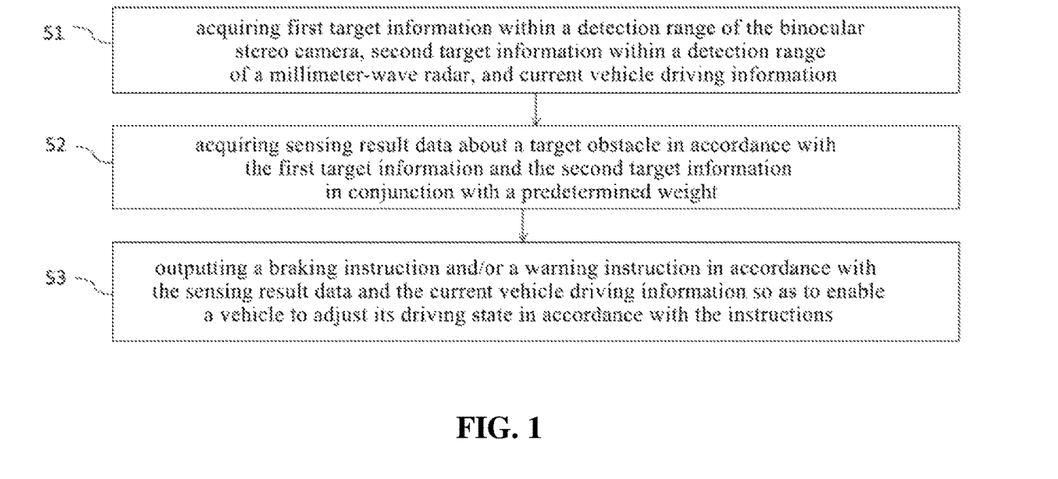
FIG. 1 is a flow chart of a vehicle braking and warning method based on a binocular stereo camera according to one embodiment of the present disclosure.

As shown in FIG. 1, the present disclosure provides in some embodiments a vehicle braking and warning method based on a binocular stereo camera, which includes the following steps.

S1: acquiring first target information within a detection range of the binocular stereo camera, second target information within a detection range of a millimeter-wave radar, and current vehicle driving information. It should be appreciated that, a same image frame may include a plurality of pieces of first target information and a plurality of pieces of second target information. In other words, the binocular stereo camera and the millimeter-wave radar may each output a plurality of targets and distances corresponding to the targets within its detection range.

S2: acquiring sensing result data about a target obstacle in accordance with the first target information and the second target information in conjunction with a predetermined weight. In actual use, output results of the millimeter-wave radar and the binocular stereo camera may have different weights with respect to different distances. With respect to a large distance and a blind zone of the binocular stereo camera, the output result of the millimeter-wave radar may be selected as the sensing result data, and with respect to a middle distance, the output result of the binocular stereo camera may be selected as the sensing result data. To be specific, a distance between the target obstacle and the vehicle may be acquired; when the distance is greater than a maximum distance threshold, e.g., 80 m, or smaller than a minimum distance threshold, e.g., 2.4 m, the second target information acquired by the millimeter-wave radar may be taken as the sensing result data; and when the distance is greater than or equal to the minimum distance threshold or smaller than or equal to the maximum distance threshold, e.g., when the distance is between 2.4 m to 80 m, such as 40 m or 50 m, the first target information acquired by the binocular stereo camera may be taken as the sensing result data. Detection accuracy of the binocular stereo camera at a large distance is smaller than that of the millimeter-wave radar, and it is impossible for the binocular stereo camera to detect the obstacle at the blind zone, so at this time, the information acquired by the millimeter-wave radar may be taken as the sensing result data. The detection accuracy of the binocular stereo camera is relatively high at a middle distance, so at this time, the information acquired by the binocular stereo camera may be taken as the sensing result data. As a result, it is able to improve the detection accuracy through selecting the sensing result data.

S3: outputting a braking instruction and/or a warning instruction in accordance with the sensing result data and the current vehicle driving information so as to enable a vehicle to adjust its driving state in accordance with the instructions.

Further, S3 may specifically include: S31 of calculating a first collision time $T_{mov}$ of the vehicle with a moving obstacle using a formula $T_{mov}=S/\Delta V$, where S represents a distance between the obstacle and the vehicle, and $\Delta V$ represents a difference between a speed of the obstacle and a speed of the vehicle in a movement direction of the vehicle; S32 of calculating a second collision time $T_{static}$ of the vehicle with a static obstacle using a formula $T_{static}=S/V$, where S represents a distance between the obstacle and the vehicle, and V represents the speed of the vehicle; S33 of, when the first collision time $T_{mov}$ is smaller than a moving obstacle braking threshold or the second collision time $T_{static}$ is smaller than a static obstacle braking threshold, outputting the braking instruction; and S34 of, when the first collision time $T_{mov}$ is smaller than a moving obstacle warning threshold or the second collision time $T_{static}$ is smaller than a static obstacle warning threshold, outputting the warning instruction.

The obstacles may include the moving obstacle and the static obstacle, and control strategies corresponding to these obstacles shall not be completely the same, so as to ensure the accuracy of the outputted instruction. In other words, the analysis and calculation in S3 are performed mainly in accordance with the collision time $T_{mov}$ for the moving obstacle and the collision time $T_{static}$ for the static obstacle.

The collision time $T_{mov}$ for the moving obstacle may refer to a time for the vehicle to collide with the obstacle (which moves relative to the vehicle) in a current movement trend, and it may be calculated using the formula $T_{mov}=S/\Delta V$ (1), where S represents the distance between the obstacle and the vehicle, and $\Delta V$ represents the difference between the speed of the obstacle and the speed of the vehicle in the movement direction of the vehicle. When the speed of the obstacle is greater than the speed of the vehicle, $T_{mov}$ may be marked as infinite.

The collision time $T_{static}$ for the static obstacle may refer to a time for the vehicle to collide with the obstacle (whose speed is zero) in a current movement trend, and it may be calculated using the formula $T_{static}=S/V$ (2), where S represents the distance between the obstacle and the vehicle, and V represents the speed of the vehicle.

In actual use, it is impossible to differentiate whether the obstacle is a moving one or a static one. Hence, it is merely necessary to calculate $T_{mov}$ and $T_{static}$ with respect to the obstacle. For each obstacle, two values, i.e., $T_{mov}$ and $T_{static}$, may be calculated in real time. When the obstacle is static, $T_{mov}$ may be equal to $T_{static}$, and when the obstacle is moving (the speed of the vehicle is greater than the speed of the obstacle, $T_{mov}$ may be greater than $T_{static}$.

In addition, four thresholds, i.e., the static obstacle braking threshold ($HMW_{Thr2}$), the moving obstacle braking threshold ($FCW_{Thr2}$), the static obstacle warning threshold ($HMW_{Thr1}$) and the moving obstacle warning threshold ($FCW_{Thr2}$), may be set in advance. To be specific, the static obstacle braking threshold may be about 0.8 s, the moving obstacle braking threshold may be about 2.0 s, the static obstacle warning threshold may be about 1.2 s, and the moving obstacle warning threshold may be about 2.7 s. Generally speaking, when a risk of collision increases, a policy-making controller may make a policy of warning first and then braking. Hence, the braking threshold needs to be smaller than the corresponding warning threshold, i.e., $HMW_{Thr2}<HMW_{Thr1}$, and $FCW_{Thr2}<FCW_{Thr1}$. In addition, for an obstacle whose speed is not zero, $T_{mov}>T_{static}$, so $FCW_{Thr2}>HMW_{Thr2}$ and $FCW_{Thr1}>HMW_{Thr1}$.

Figure 2:
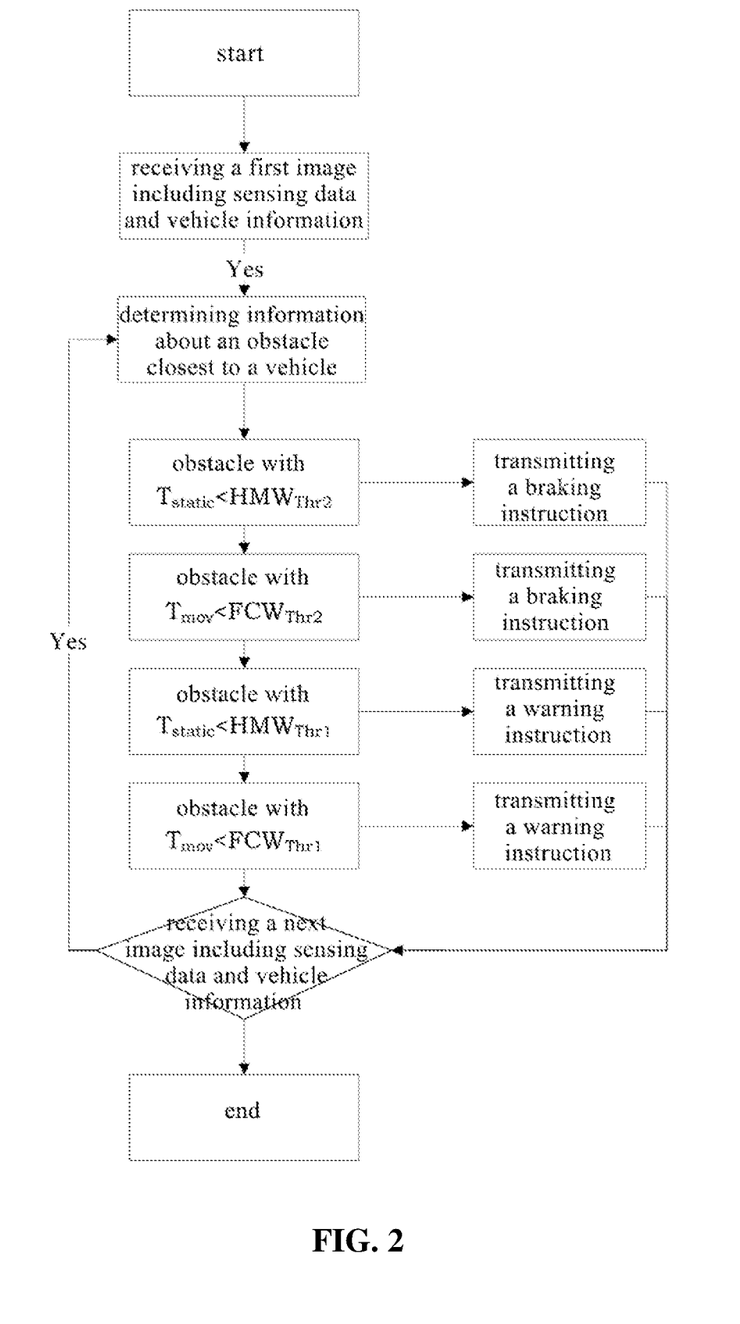
FIG. 2 is a schematic view showing the implementation of the vehicle braking and warning method in FIG. 1.

Further, the target obstacle may be an obstacle closest to the vehicle in all obstacles within the range of a vehicle movement trajectory when any sensing data and vehicle information have been received. As shown in FIG. 2, upon the receipt of an image including the sensing data and the vehicle information, the policy-making controller may traverse each obstacle, determine the obstacle closest to the vehicle within the range of the vehicle movement trajectory, and calculate $T_{mov}$ and $T_{static}$ for the obstacle. When $T_{static}<HMW_{Thr2}$, the policy-making controller may transmit the braking instruction; when $T_{mov}<FCW_{Thr2}$, the policy-making controller may transmit the braking instruction; when $T_{static}<HMW_{Thr1}$, the policy-making controller may transmit the warning instruction, and when $T_{mov}<FCW_{Thr1}$, the policy-making controller may transmit the warning instruction.

In actual use, different braking instructions may be transmitted depending on different emergency levels. To be specific, the method may further include acquiring a braking emergency level, and the braking instruction may include braking at a low frequency, braking at a middle frequency, braking at a high frequency, braking at a small force, braking at a middle force, and braking at a large force depending on the braking emergency level.

Similarly, the method may further include acquiring a warning emergency level, and the warning instruction may include warning at a low frequency and emergency warning depending on the warning emergency level.

In one scenario, the emergency level may be acquired in accordance with a value of $T_{static}$. For example, when $T_{static}<0.8$ s, the braking instruction may be transmitted. At this time, when $T_{static}=0.7$ s, it means that the emergency level is relatively low, and the corresponding braking instruction may be braking at a low frequency. When $T_{static}$=0.6 s, it means that the emergency level is higher, and the corresponding braking instruction may be braking at a middle frequency. When $T_{static}$=0.5 s, it means that the emergency level is much higher, and the corresponding braking instruction may be braking a high frequency. When $T_{static}$=0.4 s, it means that the emergency level is even much higher, and the corresponding braking instruction may be braking at a small force. When $T_{static}$=0.3 s, it means that the emergency level is even much higher, and the corresponding braking instruction may be braking at a middle force. When $T_{static}$=0.2 s, it means that the emergency level is the highest, and the corresponding braking instruction may be braking at a large force.

Prior to outputting the braking instruction and/or the warning instruction, the method may further include: acquiring a braking state and a gear position state of the vehicle; and when the vehicle is in the braking state or a gear position of the vehicle is non-drive, cancelling the output of the braking instruction and the warning instruction.

In other words, whether the instruction is to be transmitted may also depend on the braking state and the gear position state of the vehicle. When the vehicle in in the braking state, the policy-making controller may determine that the vehicle is taken over by a driver, so it may not transmit any control instruction. When the gear position of the vehicle is non-drive, the policy-making controller may not transmit any control instruction either.

According to the vehicle braking and warning method based on the binocular stereo camera in the embodiments of the present disclosure, the first target information within the detection range of the binocular stereo camera, the second target information within the detection range of the millimeter-wave radar, and the current vehicle driving information may be acquired. Next, the sensing result data about the target obstacle may be acquired in accordance with the first target information and the second target information in conjunction with the predetermined weight. Then, the braking instruction and/or the warning instruction may be outputted in accordance with the sensing result data and the current vehicle driving information so as to enable the vehicle to adjust its driving state in accordance with the instructions. Through combining the data acquired by the binocular stereo camera and the millimeter-wave radar, it is able to detect, in real time, any obstacle within the range of the driving trajectory of the vehicle, thereby to prevent the occurrence of a collision in front of the vehicle or reduce a severity level of the collision. When any obstacle occurs within the range of the driving trajectory of the vehicle, the system may automatically give a prompt or brake the vehicle, so as to prevent, or reduce to some extent, the occurrence of the collision caused when the driver is driving in fatigue, dozing, distracted or chatting, thereby to solve the problems in the related art where the types of the to-be-detected obstacles are limited, and braking and warning strategies are imperfect.

Figure 3:
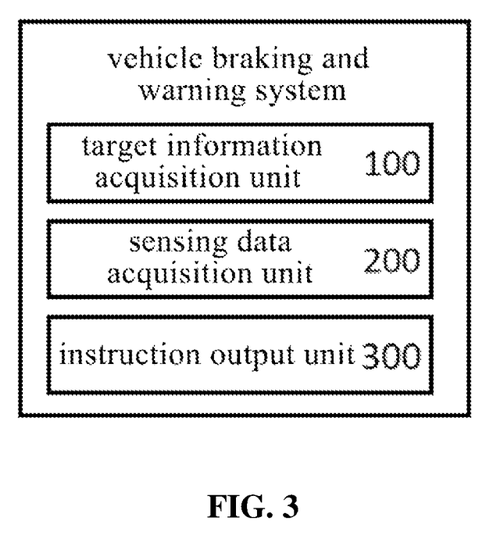
FIG. 3 is a block diagram of a vehicle braking and warning system based on a binocular stereo camera according to one embodiment of the present disclosure.

The present disclosure further provides in some embodiments a vehicle braking and warning system based on a binocular stereo camera for implementing the above-mentioned method which, as shown in FIG. 3, includes: a target information acquisition unit 100, a sensing data acquisition unit 200, and an instruction output unit 300.

The target information acquisition unit 100 is configured to acquire first target information within a detection range of the binocular stereo camera, second target information within a detection range of a millimeter-wave radar, and current vehicle driving information. The target information acquisition unit may be just a sensing module which includes the binocular stereo camera and the millimeter-wave radar. As the sensing modules, the binocular stereo camera and the millimeter-wave radar may each output a plurality of targets and distances corresponding to the targets within its detection range to a policy-making controller in real time.

The sensing data acquisition unit 200 is configured to acquire sensing result data about a target obstacle in accordance with the first target information and the second target information in conjunction with a predetermined weight. Output results of the millimeter-wave radar and the binocular stereo camera may have different weights with respect to different distances. With respect to a large distance and a blind zone of the binocular stereo camera, the output result of the millimeter-wave radar may be selected as the sensing result data, and with respect to a middle distance, the output result of the binocular stereo camera may be selected as the sensing result data.

The instruction output unit 300 is configured to output a braking instruction and/or a warning instruction in accordance with the sensing result data and the current vehicle driving information so as to enable an execution module of a vehicle to adjust a driving state in accordance with the instructions. In terms of hardware composition, the execution module may include a braking execution system and a man-machine interaction screen. The braking execution system is configured to control an electric motor to rotate in a forward or reverse direction, and control a rotation speed, so as to control a stroke of a brake pedal through a brake cable. The man-machine interaction screen is configured to display various icons, and a buzzer (or horn) may be built therein. Usually, the man-machine interaction screen is placed in front of a driving seat, so as to provide an audible or visual alarm to the driver.

Figure 4:
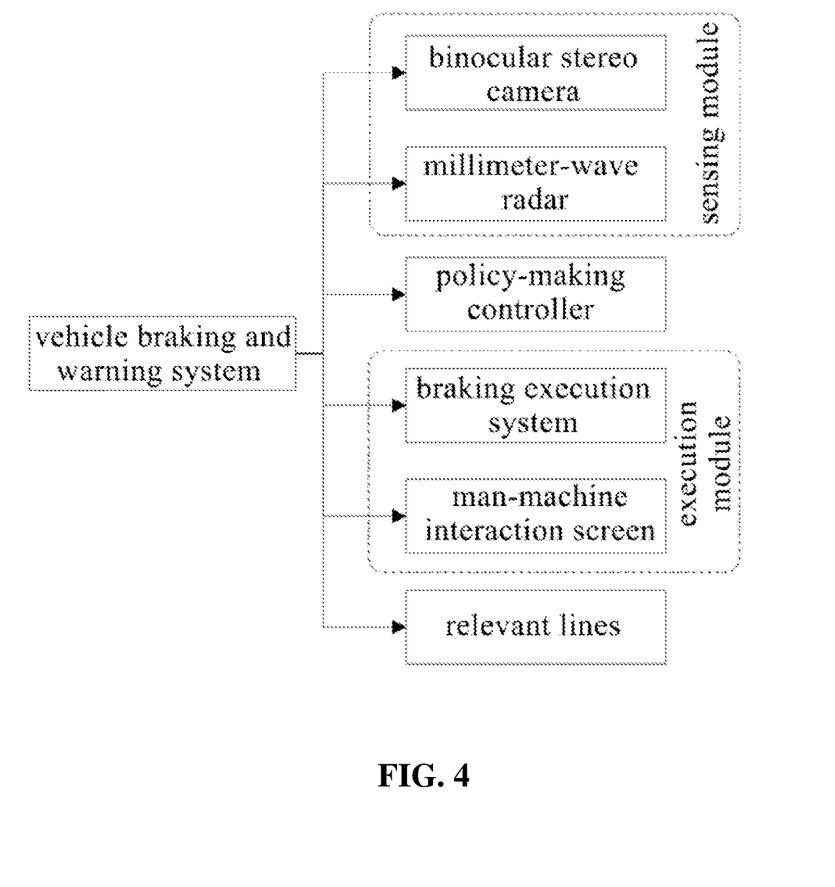
FIG. 4 is a schematic view showing a hardware structure of the vehicle braking and warning system according to one embodiment of the present disclosure.

As shown in FIG. 4, the vehicle braking and warning system based on a binocular stereo camera may mainly include the binocular stereo camera, the millimeter-wave radar, the policy-making controller, the braking execution system, the man-machine interaction screen, and relevant lines. The binocular stereo camera and the millimeter-wave radar may form a sensing module for acquiring relevant data, and the braking execution system and the man-machine interaction screen may form the execution module for executing the related instructions.

The instruction output unit is further configured to: calculate a first collision time $T_{mov}$ of the vehicle with a moving obstacle using a formula $T_{mov}$=S/$\Delta V$, where S represents a distance between the obstacle and the vehicle, and $\Delta V$ represents a difference between a speed of the obstacle and a speed of the vehicle in a movement direction of the vehicle; calculate a second collision time $T_{static}$ of the vehicle with a static obstacle using a formula $T_{static}$=S/V, where S represents a distance between the obstacle and the vehicle, and V represents the speed of the vehicle; when the first collision time $T_{mov}$ is smaller than a moving obstacle braking threshold or the second collision time $T_{static}$ is smaller than a static obstacle braking threshold, output the braking instruction; and when the first collision time $T_{mov}$ is smaller than a moving obstacle warning threshold or the second collision time $T_{static}$ is smaller than a static obstacle warning threshold, output the warning instruction.

To be specific, the sensing data acquisition unit and the instruction output unit may communicate with the policy-making controller, receive, in real time, the sensing result data from the millimeter-wave radar and the binocular stereo camera, and read, in real time, the vehicle information via a Controller Area Network (CAN) bus, including a vehicle speed, a steering state, a braking state, and a gear position state. The policy-making controller may perform analysis and calculation in accordance with the data and information, and determine whether to transmit the warning instruction or the braking instruction. The collision time $T_{mov}$ for the moving obstacle may refer to a time for the vehicle to collide with the obstacle (which moves relative to the vehicle) in a current movement trend, and it may be calculated using the formula $T_{mov}=S/\Delta V$ (1), where S represents the distance between the obstacle and the vehicle, and $\Delta V$ represents the difference between the speed of the obstacle and the speed of the vehicle in the movement direction of the vehicle. When the speed of the obstacle is greater than the speed of the vehicle, $T_{mov}$ may be marked as infinite.

The collision time $T_{static}$ for the static obstacle may refer to a time for the vehicle to collide with the obstacle (whose speed is zero) in a current movement trend, and it may be calculated using the formula $T_{static}=S/V$ (2), where S represents the distance between the obstacle and the vehicle, and V represents the speed of the vehicle.

In actual use, it is impossible to differentiate whether the obstacle is a moving one or a static one. Hence, it is merely necessary to calculate $T_{mov}$ and $T_{static}$ with respect to the obstacle. For each obstacle, two values, i.e., $T_{mov}$ and $T_{static}$, may be calculated in real time. When the obstacle is static, $T_{mov}$ may be equal to $T_{static}$, and when the obstacle is moving (the speed of the vehicle is greater than the speed of the obstacle, $T_{mov}$ may be greater than $T_{static}$.

In addition, four thresholds, i.e., the static obstacle braking threshold ($HMW_{Thr2}$), the moving obstacle braking threshold ($FCW_{Thr2}$), the static obstacle warning threshold ($HMW_{Thr1}$) and the moving obstacle warning threshold ($FCW_{Thr1}$) may be set in advance. To be specific, the static obstacle braking threshold may be about 0.8 s, the moving obstacle braking threshold may be about 2.0 s, the static obstacle warning threshold may be about 1.2 s, and the moving obstacle warning threshold may be about 2.7 s. Generally speaking, when a risk of collision increases, a policy-making controller may make a policy of warning first and then braking. Hence, the braking threshold needs to be smaller than the corresponding warning threshold, i.e., $HMW_{Thr2}<HMW_{Thr1}$, and $FCW_{Thr2}<FCW_{Thr1}$. In addition, for an obstacle whose speed is not zero, $T_{mov}>T_{static}$, so $FCW_{Thr2}>HMW_{Thr2}$ and $FCW_{Thr1}>HMW_{Thr1}$.

Depending on an emergency level, different braking instructions may be transmitted by the policy-making controller, braking at a low frequency, braking at a middle frequency, braking at a high frequency, braking at a small force, braking at a middle force, and braking at a large force depending on the braking emergency level. In addition, depending on the emergency level, different warning instructions may be transmitted by the policy-making controller, e.g., warning at a low frequency and emergency warning depending on the warning emergency level. In addition, whether the instruction is to be transmitted may also depend on the braking state and the gear position state of the vehicle. When the vehicle in in the braking state, the policy-making controller may determine that the vehicle is taken over by a driver, so it may not transmit any control instruction. When the gear position of the vehicle is non-drive, the policy-making controller may not transmit any control instruction either.

According to the vehicle braking and warning system based on the binocular stereo camera in the embodiments of the present disclosure, the first target information within the detection range of the binocular stereo camera, the second target information within the detection range of the millimeter-wave radar, and the current vehicle driving information may be acquired. Next, the sensing result data about the target obstacle may be acquired in accordance with the first target information and the second target information in conjunction with the predetermined weight. Then, the braking instruction and/or the warning instruction may be outputted in accordance with the sensing result data and the current vehicle driving information so as to enable the vehicle to adjust its driving state in accordance with the instructions. Through combining the data acquired by the binocular stereo camera and the millimeter-wave radar, it is able to detect, in real time, any obstacle within the range of the driving trajectory of the vehicle, thereby to prevent the occurrence of a collision in front of the vehicle or reduce a severity level of the collision. When any obstacle occurs within the range of the driving trajectory of the vehicle, the system may automatically give a prompt or brake the vehicle, so as to prevent, or reduce to some extent, the occurrence of the collision caused when the driver is driving in fatigue, dozing, distracted or chatting, thereby to solve the problems in the related art where the types of the to-be-detected obstacles are limited, and braking and warning strategies are imperfect.

The present disclosure further provides in some embodiments a vehicle braking and warning device based on a binocular stereo camera, which includes a data collection unit configured to collect data, a memory configured to store therein one or more program instructions, and a processor configured to execute the one or more program instruction so as to implement the above-mentioned method.

Correspondingly, the present disclosure further provides in some embodiments a computer-readable storage medium storing therein one or more program instructions. The one or more program instructions are executed by a binocular camera depth calibration system so as to implement the above-mentioned method.

In the embodiments of the present disclosure, the processor may be an integrated circuit (IC) having a signal processing capability. The processor may be a general-purpose processor, a Digital Signal Processor (DSP), an Application Specific Integrated Circuit (ASIC), a Field Programmable Gate Array (FPGA) or any other programmable logic element, discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as a Random Access Memory (RAM), a flash memory, a Read-Only Memory (ROM), a Programmable ROM (PROM), an Electrically Erasable PROM (EEPROM), or a register. The processor may read information stored in the storage medium so as to implement the steps of the method in conjunction with the hardware.

The storage medium may be a memory, e.g., a volatile, a nonvolatile memory, or both.

The nonvolatile memory may be an ROM, a PROM, an EPROM, an EEPROM or a flash disk.

The volatile memory may be an RAM which serves as an external high-speed cache. Illustratively but nonrestrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM).

The storage medium in the embodiments of the present disclosure intends to include, but not limited to, the above-mentioned and any other appropriate memories.

It should be appreciated that, in one or more examples, the functions mentioned in the embodiments of the present disclosure may be achieved through hardware in conjunction with software. For the implementation, the corresponding functions may be stored in a computer-readable medium, or may be transmitted as one or more instructions on the computer-readable medium. The computer-readable medium may include a computer-readable storage medium and a communication medium. The communication medium may include any medium capable of transmitting a computer program from one place to another place. The storage medium may be any available medium capable of being accessed by a general-purpose or special-purpose computer.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A vehicle braking and warning method based on a binocular stereo camera, comprising:
    acquiring first target information within a detection range of the binocular stereo camera, second target information within a detection range of a millimeter-wave radar, and current vehicle driving information;
    acquiring sensing result data about a target obstacle in accordance with the first target information and the second target information in conjunction with a predetermined weight;
    acquiring a braking emergency level, and selecting a corresponding braking instruction selected from braking at a low frequency, braking at a middle frequency, braking at a high frequency, braking at a small force, braking at a middle force, and braking at a large force depending on the braking emergency level;
    acquiring a warning emergency level, and selecting a corresponding warning instruction selected from warning at a low frequency and emergency warning depending on the warning emergency level; and
    outputting the braking instruction and/or the warning instruction to adjust a driving state of a vehicle in accordance with the braking instruction and/or the warning instruction, wherein
    the acquiring the sensing result data comprises:
    acquiring a distance between the target obstacle and the vehicle;
    when the distance is greater than a maximum distance threshold or smaller than a minimum distance threshold, taking the second target information acquired by the millimeter-wave radar as the sensing result data; and
    when the distance is greater than or equal to the minimum distance threshold and smaller than or equal to the maximum distance threshold, taking the first target information acquired by the binocular stereo camera as the sensing result data.

2. The vehicle braking and warning method according to claim 1, wherein the outputting the braking instruction and/or the warning instruction in accordance with the sensing result data and the current vehicle driving information so as to enable the vehicle to adjust its driving state in accordance with the braking instruction and/or the warning instruction comprises:
    calculating a first collision time $T_{mov}$ of the vehicle with a moving obstacle using a formula $T_{mov}=S/\Delta V$, where S represents a distance between the obstacle and the vehicle, and $\Delta V$ represents a difference between a speed of the obstacle and a speed of the vehicle in a movement direction of the vehicle;
    calculating a second collision time $T_{static}$ of the vehicle with a static obstacle using a formula $T_{static}=S/V$, where S represents a distance between the obstacle and the vehicle, and V represents the speed of the vehicle;
    when the first collision time $T_{mov}$ is smaller than a moving obstacle braking threshold or the second collision time $T_{static}$ is smaller than a static obstacle braking threshold, outputting the braking instruction; and
    when the first collision time $T_{mov}$ is smaller than a moving obstacle warning threshold or the second collision time $T_{static}$ is smaller than a static obstacle warning threshold, outputting the warning instruction.

3. The vehicle braking and warning method according to claim 1, wherein the target obstacle is an obstacle closest to the vehicle in all obstacles within the range of a vehicle movement trajectory when any sensing data and vehicle information have been received.

4. The vehicle braking and warning method according to claim 1, wherein prior to outputting the braking instruction and/or the warning instruction, the vehicle braking and warning method further comprises:
    acquiring a braking state and a gear position state of the vehicle; and
    when the vehicle is in the braking state or a gear position of the vehicle is non-drive, cancelling the output of the braking instruction and the warning instruction.

5. A vehicle braking and warning system based on a binocular stereo camera for implementing the vehicle braking and warning method according to claim 1, comprising:
    a target information acquisition unit configured to acquire first target information within a detection range of the binocular stereo camera, second target information within a detection range of a millimeter-wave radar, and current vehicle driving information;
    a sensing data acquisition unit configured to acquire sensing result data about a target obstacle in accordance with the first target information and the second target information in conjunction with a predetermined weight; and
    an instruction output unit configured to output a braking instruction and/or a warning instruction in accordance with the sensing result data and the current vehicle driving information so as to enable a vehicle to adjust its driving state in accordance with the braking instruction and/or the warning instruction.

6. The vehicle braking and warning system according to claim 5, wherein the instruction output unit is further configured to:
    calculate a first collision time $T_{mov}$ of the vehicle with a moving obstacle using a formula $T_{mov}=S/\Delta V$, where S represents a distance between the obstacle and the vehicle, and $\Delta V$ represents a difference between a speed of the obstacle and a speed of the vehicle in a movement direction of the vehicle;
    calculate a second collision time $T_{static}$ of the vehicle with a static obstacle using a formula $T_{static}=S/V$, where S represents a distance between the obstacle and the vehicle, and V represents the speed of the vehicle;

when the first collision time $T_{mov}$ is smaller than a moving obstacle braking threshold or the second collision time $T_{static}$ is smaller than a static obstacle braking threshold, output the braking instruction; and when the first collision time $T_{mov}$ is smaller than a moving obstacle warning threshold or the second collision time $T_{static}$ is smaller than a static obstacle warning threshold, output the warning instruction.

7. A vehicle braking and warning device based on a binocular stereo camera, comprising a data collection unit configured to collect data, a memory configured to store therein one or more program instructions, and a processor configured to execute the one or more program instructions so as to implement the vehicle braking and warning method according to claim 1.

8. A non-transitory computer-readable storage medium storing therein one or more program instructions for implementing the vehicle braking and warning method according to claim 1.

* * * * *